(12) United States Patent
Seifert

(10) Patent No.: US 6,550,851 B2
(45) Date of Patent: Apr. 22, 2003

(54) MOTOR VEHICLE WITH A ROOF MODULE AND A PROCESS FOR PRODUCING ONE SUCH MODULE

(75) Inventor: Wolfgang Seifert, Germering (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 09/853,041

(22) Filed: May 11, 2001

(65) Prior Publication Data
US 2002/0005656 A1 Jan. 17, 2002

(30) Foreign Application Priority Data
May 11, 2000 (DE) .......................... 100 22 915

(51) Int. Cl.$^7$ ................... B62D 25/06; B62D 25/07
(52) U.S. Cl. .................... 296/210; 296/214; 296/197
(58) Field of Search ............... 296/210, 214, 296/216.06, 216.07, 216.09, 197, 196

(56) References Cited

U.S. PATENT DOCUMENTS

| | | | |
|---|---|---|---|
| 4,358,883 A | | 11/1982 | Gerring |
| 4,653,802 A | * | 3/1987 | Watanabe et al. ........... 296/210 |
| 4,957,326 A | * | 9/1990 | Chiba et al. ................. 296/210 |
| 5,018,781 A | * | 5/1991 | Kumasaka et al. ......... 296/210 |
| 5,860,694 A | * | 1/1999 | Seefried et al. .......... 296/203.03 |
| 6,003,898 A | * | 12/1999 | Teply et al. .................. 296/204 |
| 6,027,160 A | * | 2/2000 | Brodt et al. ................. 296/210 |
| 6,318,797 B1 | * | 11/2001 | Bohm et al. ................. 296/210 |
| 6,340,204 B1 | * | 1/2002 | Seifert .................... 296/216.07 |
| 6,347,829 B1 | * | 2/2002 | Hanyu ......................... 296/210 |
| 6,367,871 B2 | * | 4/2002 | Grimm et al. ............... 296/210 |
| 6,367,872 B1 | * | 4/2002 | Bohm et al. ................. 296/214 |

FOREIGN PATENT DOCUMENTS

| | | | |
|---|---|---|---|
| DE | 32 22 419 A1 | 12/1983 | |
| GB | 2330118 | * 4/1999 | ................. 296/210 |
| WO | WO 98/39170 | * 9/1998 | ................. 296/210 |

* cited by examiner

Primary Examiner—D. Glenn Dayoan
Assistant Examiner—Greg Blankenship
(74) Attorney, Agent, or Firm—Nixon Peabody LLP; David S. Safran

(57) ABSTRACT

A motor vehicle roof with a roof module (10) for attachment to the roof frame area of a motor vehicle body, with support edges (15) for the roof module (10) which inwardly adjoin the side rails (14) of the vehicle body, the roof module (10) having an outside roof skin (11) which has side edges (16) which are bent downward toward the support edges (15). On the roof skin (11), in the area of its side edges (16), there are connecting strips (18) which have bottoms for attachment to the support edges (15) of the roof frame area and which are joined to the roof skin (11), preferably by being injection molded or foamed on to it.

9 Claims, 1 Drawing Sheet

MOTOR VEHICLE WITH A ROOF MODULE AND A PROCESS FOR PRODUCING ONE SUCH MODULE

BACKGROUND OF THE INVENTION

1. Field of the Invention

This invention relates to a motor vehicle roof with a roof module for attachment to the roof frame area of a motor vehicle body, with support edges which inwardly adjoin the side rails of the motor vehicle body for the roof module, and with a roof skin which has side edges bent downward onto the support edges. The invention also relates to a process for producing such a roof module.

2. Description of Related Art

German Patent DE 32 22 419 C2 discloses a motor vehicle roof of the above mentioned type in which the roof skin of sheet metal is crimped down on the side edges and is also angled to the outside. The resulting horizontal resting area is used for attachment to the support edge of the motor vehicle body.

U.S. Pat. No. 4,358,883 discloses a method of converting a passenger compartment of a motor vehicle roof in which the roof skin is removed and a top cap applied, the side edge of the top cap being notched and seated on a vertical side wall of the motor vehicle body that has a matched notching.

The roof module of the vehicle roof of the initially mentioned type which is completely pre-mounted, for example, with the inside head liner cemented to the flat support edges of the roof frame area of the motor vehicle body. For this purpose, in the simplest case, the welding of the skin of conventional motor vehicle roofs is replaced by cementing. For this purpose, similarly to German Patent DE 32 22 419 C2, the side edges of the roof module are bent down and out and the outwardly bent section of the side edge of the roof module is cemented to the flat support edges of the roof frame area. The defect here is that the joint which is formed between the side rail of the motor vehicle body and the roof skin of the roof module is relatively wide and requires an additional cover strip.

Smaller joint widths are achieved, for example, in the case of a motor vehicle roof with a roof module in which the roof skin of the roof module is foamed underneath over its entire area with the side edges bent down, the outside edge of the bottom foaming being used to cement the roof module to the roof frame area of the motor vehicle body. The defect here is that the flat bottom foaming is associated with relatively high costs and relatively high weight which adds to the weight of the roof skin which conventionally is made of sheet metal or a plastic film.

SUMMARY OF THE INVENTION

In view of this prior art, a primary object of the present invention is to devise a motor vehicle roof of the initially mentioned type and a process for producing a roof module in which the roof module is light-weight and can be economically produced, and a small joint width is ensured between the side rails of the motor vehicle body and the roof skin of the roof module.

This object is achieved by a motor vehicle roof having connecting strips which have bottoms which are intended for attachment to the support edges of the roof frame area provided on the inside of the roof skin in the area of its side edges.

The roof skin of the roof module of the motor vehicle roof in accordance with the invention can be attached to the roof frame area while ensuring a small joint width between the roof skin and the laterally adjoining side rails of the motor vehicle body because the adhesive surfaces required for this purpose are provided by the bottoms of the connecting strips which are attached on both sides on the bottom of roof skin. These connecting strips, as compared to the remaining roof module, have low mass and thus do not contribute much to the total weight of the roof module. As a result of the small amount of material used, which is necessary for the connecting strips, they moreover represent an economical measure for connecting the roof module to the roof frame area of the motor vehicle body, in contrast to the initially mentioned prior art with complete bottom foaming of the roof skin of the roof module.

To guarantee a reliable connection between the roof module and the roof frame area of the motor vehicle body, the bottoms of the connecting strips preferably run essentially parallel to the flat support edges of the roof frame area.

To cement the roof module to the roof frame area via its lateral connecting strips, beads of cement which are applied to the bottoms of the connecting strips are preferably used.

The connecting strips can be made in different ways and can be connected to the roof skin of the roof module. In favor of a stable connection between the connecting strips and the roof skin, the connecting strips are molded onto the bottom of the roof skin and/or the inside of their bent side edges. In this case, the connecting strips are preferably formed of plastic or metal foam, mainly aluminum foam.

The invention is limited not only to a roof module with side connecting edges, but can also be applied to a roof module which comprises peripheral edges which are bent downward and which are connected to the peripheral support edges of the roof frame area via likewise peripherally formed connecting strips on the outside edge of the roof skin.

The connecting strips of the motor vehicle roof according to the invention can be made in different ways in the roof module. One advantageous process in accordance with the invention calls for the connecting strips to be foamed to the bottom of the roof skin and/or the inside of its bent side edges. One alternative is a process in which the foaming is replaced by injection molding. As a modification thereof, the connecting strips can be formed by extrusion with the roof skin and/or its bent side edges. However, for attachment of the connecting strips or for their production, a tape placement process is suitable in which connecting strips in the form of tapes are placed on the bottom of the roof skin and/or the inside of the bent side edges of the roof skin.

The connecting strips in accordance with the invention are especially suitable when they are made of a foam material, also for pre-installation of a vehicle roof head liner or other components, such as, for example, electrical cable, by providing the corresponding receivers in the connecting strips and/or molding it or the components in.

The invention is explained in detail below using the accompanying drawings by way of example.

DETAILED DESCRIPTION OF THE INVENTION

Figure 1:
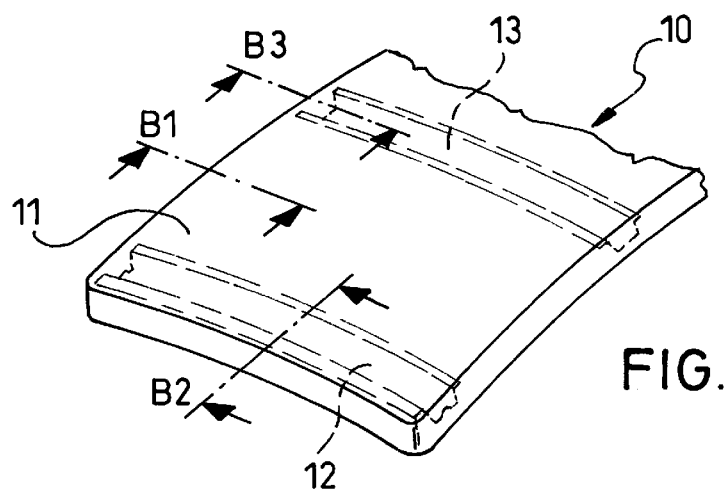
FIG. 1 is a schematic overhead perspective view of a portion roof module of a motor vehicle roof in accordance with the invention.

The motor vehicle roof module 10 (see FIG. 1) is matched to the conventional arch of the motor vehicle roof and comprises an outside roof skin 11, preferably of sheet metal or plastic, and as stiffening, several roof bows which run transversely on the bottom of the roof skin 11, of which FIG. 1 shows a front roof bow 12 and a middle roof bow 13.

Figure 2:
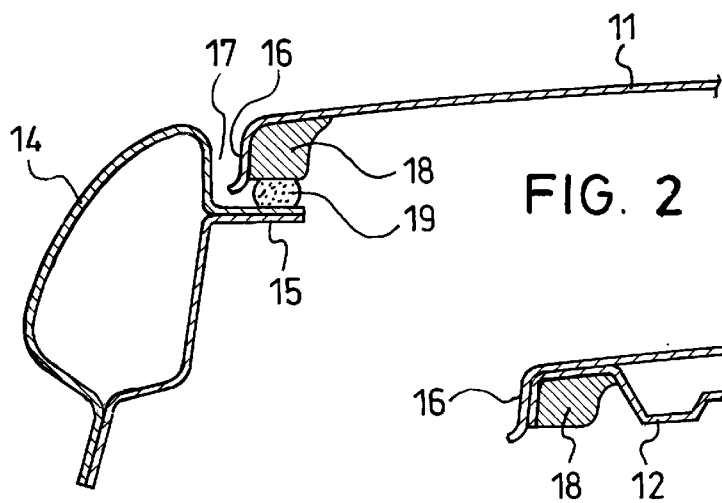
FIG. 2 is a sectional representation of the roof module taken along line B1 of FIG. 1, shown inserted into the roof frame area.
Figure 3:
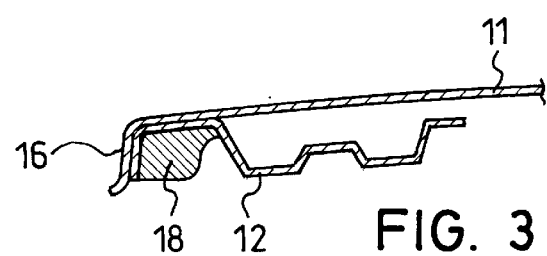
FIG. 3 is a sectional representation of the roof module taken along line B2 of FIG. 1 shown inserted into the roof frame area.
Figure 4:
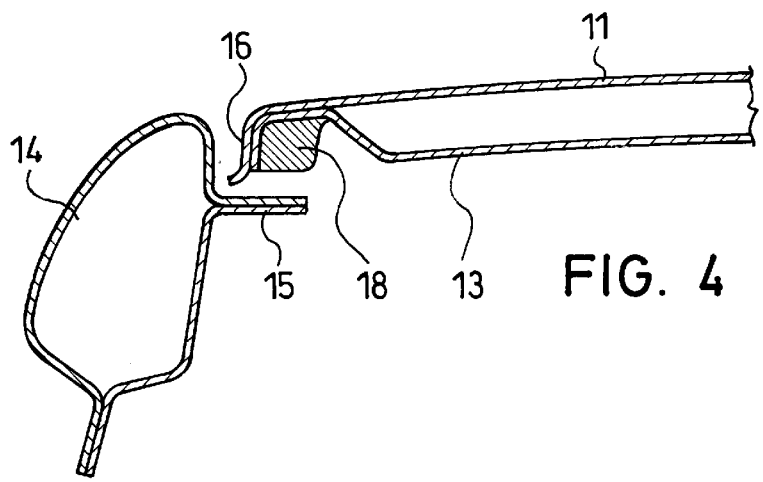
FIG. 4 is a sectional representation of the roof module taken along line B3 of FIG. 1 shown inserted into the roof frame area.

The roof module 10, which is rectangular in outline, is inserted into a corresponding rectangular recess in the vehicle roof adjoining the side rails 14 of the motor vehicle body. The side rails 14 are sheet metal profile parts. Each of the side rails 14, for example, the side rail 14 which is shown in FIGS. 2 & 4, has an inside roof frame area in the form of a flat support edge 15 which is used to support the roof module 10 at each side and which, in conventional motor vehicle roof constructions, is used to be welded to the roof skin of the roof module. In the case of the embodiment of the motor vehicle roof described here, with the roof module 10, there is no welding of the roof skin 11 to the support edge 15 of the roof frame area, but rather the roof skin 11 of the roof module 10 is cemented to the side support edges 15. The roof skin 11 is preferably formed of sheet metal that has been bent down on its side edges so that the roof skin 11 has a roughly U-shaped cross section. Between each side edge 16 and the respective side rail 11, there remains a gap 17 which is made as narrow as possible. To ensure this, on the bottom of the roof skin 11, in the area of its side edges, there are connecting strips 18.

The connecting strip 18 is foamed preferably to the bottom of the roof skin 11 and the inside of the side edge 16, and thus, is joined permanently to the roof skin 11. Each connecting strip 18 extends at least over the two side edges of the roof module 10, but preferably also in the area of the front and rear edges and the stiffeners of the roof skin 11 (for example, of the front roof bow 12 and the middle roof bow 13). The height of the connecting strip 18 corresponds roughly to the height of the side edge 16. In the embodiment shown, the connecting strip 18 ends set back from the bottom end of the side edge 16 in a surface which runs essentially parallel to the support edge 15. This bottom of the connecting strip 18 is used to cement the roof skin 11 to the support edge 15. A bead 19 of cement applied between the bottom of the connecting strip 18 and the top of the support edge 15 is used for this purpose. As a result of its functionally low height and low width, the connecting strip 18 has low mass and thus does not contribute much to the weight of the roof module 10. It can be produced more easily and exactly than an additional horizontal bevel of the side edge 16, pointed to the inside or outside.

In the connecting strips 18, there can also be receivers for detachable pre-installation of the inside headliner or other components, such as, for example, electrical cable. These components can also be embedded in the connecting strips when the roof module is being installed, i.e., when the connecting strips are foamed, for example, onto the roof skin 11, or are injection molded onto it or are applied in a tape placement process and in this way cemented on. The material for the connecting strips 18 can be a plastic foam as well as aluminum foam.

The bottoms of the connecting strips 18 can be arranged flush with the side edges 16 in contrast to the representation in FIGS. 1 to 4 or can also project downward slightly over these edges.

What is claimed is:

1. Motor vehicle roof comprising: a motor vehicle body having a roof frame area with side rails, a roof module for attachment to the roof frame area of the motor vehicle body, horizontal support edges which inwardly adjoin the side rails for mounting of the roof module; wherein the roof module has a roof skin with side edges that have been bent downward toward the support edges, wherein connecting strips are provided on an inner side of the roof skin in a side edge area thereof, said connecting strips being attached on the support edges of the roof frame area and also molded onto at least one of the inner side of the roof skin and the inside of the bent side edges, wherein said connecting strips are made of a plastic foam.

2. Motor vehicle roof as claimed in claim 1, wherein bottoms of the connecting strips run essentially parallel to the horizontal support edges.

3. Motor vehicle roof as claimed in claim 2, wherein the bottoms of the connecting strips are provided with beads of cement.

4. Motor vehicle roof as claimed in claim 1, wherein the connecting strips are made of aluminum foam.

5. Process for producing a roof module for a motor vehicle as claimed in claim 1, wherein the connecting strips have been foamed onto at least one of the inner side of the roof skin and an inner side of the bent side edges.

6. Process for producing a roof module for a motor vehicle roof as claimed in claim 1, wherein the connecting strips have been injection molded onto at least one of the inner side of the roof skin and an inner side of the bent side edges.

7. Process for producing a roof module for a motor vehicle roof as claimed in claim 1, wherein the connecting strips have been extrusion molded onto at least one of the inner side of the roof skin and the inside of the bent side edges.

8. Process for producing a roof module for attachment to a side rails of roof frame area of a vehicle body having horizontal support edges which extend inwardly from the side rails; comprising the steps of:

providing the roof module with a roof skin having side edges that have been bent downward;

providing connecting strips on an inner side of the roof skin in a side edge area thereof, said connecting strips being applied as tapes and cemented to at least one of the inner side of the roof skin and an inner side of the bent side edges, wherein said connecting strips are made of a plastic foam.

9. Motor vehicle roof comprising: a motor vehicle body having a roof frame area with side rails, a roof module for attachment to the roof frame area of the motor vehicle body, horizontal support edges which inwardly adjoin the side rails for mounting of the roof module; wherein the roof module has a roof skin with side edges that have been bent downward toward the support edges, wherein connecting strips are provided on an inner side of the roof skin in a side edge area thereof, said connecting strips being attached on the support edges of the roof frame area and also molded onto at least one of the inner side of the roof skin and the inside of the bent side edges, wherein said connecting strips are made of a metal foam.

* * * * *